Dec. 25, 1945.    M. SILGE    2,391,599
REFRACTOMETER
Filed Feb. 24, 1945
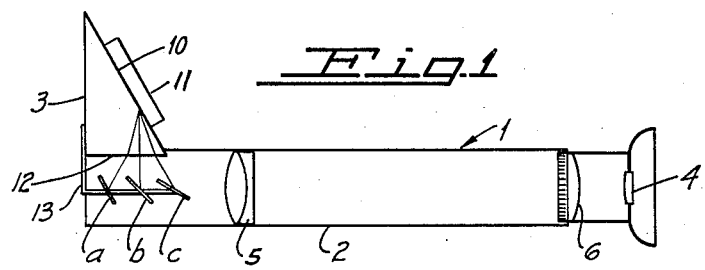
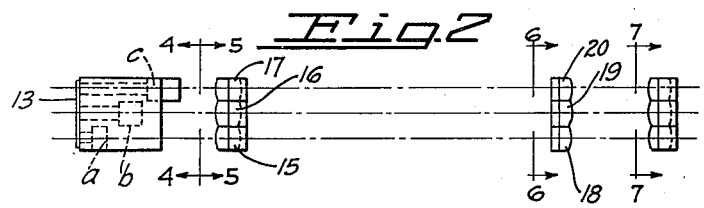
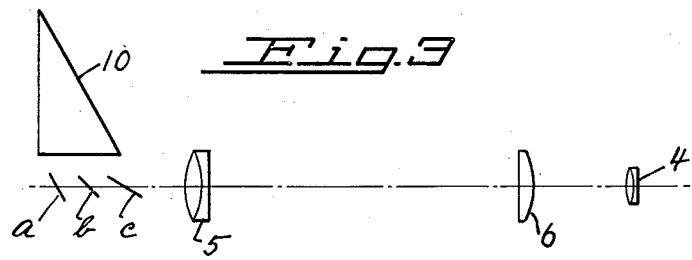
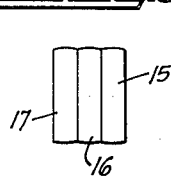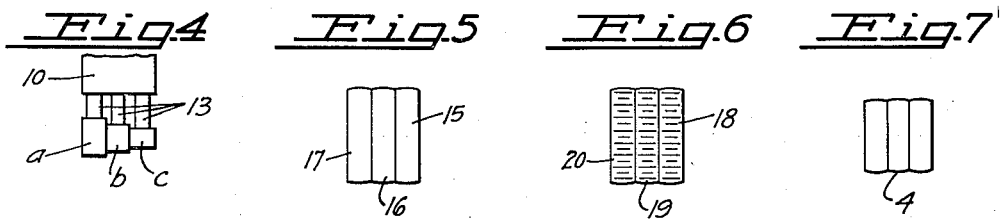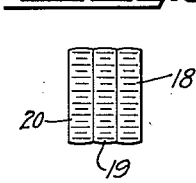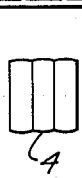
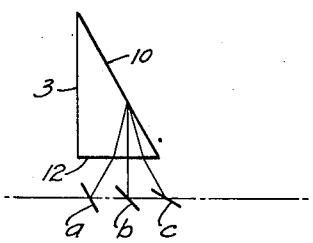
INVENTOR.
MARTIN SILGE
BY A. Schapp
ATTORNEY Patented Dec. 25, 1945

2,391,599

UNITED STATES PATENT OFFICE 2,391,599

REFRACTOMETER

Martin Silge, Oakland, Calif.

Application February 24, 1945, Serial No. 579,519

2 Claims. (Cl. 88—14)

The present invention relates to improvements in refractometers, and this application is a continuation in part of my co-pending application, Serial Number 459,139, filed September 21, 1942 (Patent No. 2,383,347, issued August 21, 1945).

The invention has particular reference to refractometers used in measuring the light refracting power of samples such as liquids, semi-solids and solids to establish certain physical properties of such samples. Refractometers of this type are based on the principle of total reflection and may be divided into two groups:

(a) Refractometers with index prism and telescope arranged so that one unit may be moved mechanically with respect to the other. The borderline of total reflection is observed through the telescope and is brought into coincidence with a suitable target in the telescope. The angular displacement observed between the index prism and the telescope then is translated into refractive indices or corresponding values such as percentages of soluble solids present. This group comprises such refractometers as Abbe, Pulfrich, crystal, and similar popular types.

(b) Refractometers with index prism and telescope forming a rigid unit with regard to each other. A scale in the ocular of the telescope serves to read directly the position of the borderline of total reflection of the sample. This group comprises refractometers of the dipping (immersion) and various so-called hand-refractometer types.

The relative merits of the two types of refractometers are clearly marked. Refractometers of the (a) group have a relatively wide measuring range, covering such range as $nD=1.3$ to $nD=1.7$, or more. Their measuring accuracy, however, is necessarily limited because of the inherent deficiencies associated with such mechanical components as moving levers, bearings, spindles, racks and pinions, etc., and such parts form construction elements of importance in these refractometers.

In most of the instruments of this type the manufacturers, therefore, limit the reading accuracy to within a few units of the fourth decimal of the refractive index $nD$. Mechanical wear and tear has necessarily a direct effect on the accuracy and dependability of these instruments.

Refractometers of the (b) group do not require moving mechanical parts for the purpose of determining the position of the borderline of total reflection because the image of the latter is cast directly onto the scale inside of the telescope tube where it is read through the ocular. The position of this image is entirely a function of the refractive index of the sample being measured and the optical properties of the index prism and the telescope of the refractometer.

The reading accuracy is largely controlled by the telescope magnification. The higher the latter, the greater the relative displacement of the image of the borderline of total reflection for two neighboring refractive indices, which in turn permits higher reading accuracy against scale divisions.

Dipping (immersion) refractometers, utilizing this principle, are built to read the refractive index $nD$ reliably to within a few units of the fifth decimal and are considered the most accurate of commercial refractometers. This accuracy could, no doubt, be increased further by the use of still higher telescope magnification.

However, since, everything else being equal, the field of view of a telescope is approximately inversely proportional to its magnification, the measuring range of refractometers in this field is limited, and in no case can it be greater than the range of refractive indices embraced by the scale in the ocular.

In order to increase the total range of such refractometers, a whole series of interchangeable index prisms, made of glass of different refractive indices and of differing refractive angles, have been provided. Each change of prism, however, requires a recalibration of the instrument; is awkward, and may cause damage. This method, therefore, has not become popular, and its use is confined to research laboratories. Little use is made of it in production control, as it seems to preclude the use of unskilled technicians.

In certain so-called hand-refractometers based on the principle of the (b) group, a comparatively low telescope magnification is employed and no provision is made for the interchangeability of the index prism. But, in spite of the lower telescope magnification, the measuring range of these hand-refractometers is not sufficient to cover all requirements of the various users, and it has been found necessary, therefore, to develope a number of such instruments, each covering a different range.

In the present invention it is proposed to provide a refractometer which combines the advantages of refractometers of the (a) and (b) groups, while avoiding the disadvantages of either.

In my co-pending application it was proposed in the principle form, to combine an index prism having refractive characteristics commanding consecutive, possibly overlapping ranges of refractive power with a telescope containing a series of fixed scales of consecutive ranges cooperative with the different ranges covered by said index prism. It was the purpose of these scales to indicate the refractive index or other desired properties, such as percentage of sugar content, of the object under observation on the particular scale corresponding to the portion of the index prism commanding the range within which the object under observation happened to fall.

It was also proposed in the co-pending application, in an alternative form, to use a simple index prism with just one refractive angle in conjunction with a plurality of reflectors performing in such a manner that appropriate portions of the total measuring range were reflected onto corresponding scales, to accomplish the same object. The present application is directed to this alternate form of the invention.

It is further proposed to provide in the same telescope, a corresponding series of objectives, each objective cooperating with the respective reflector and the corresponding scale to form an image of the borderline of total reflection on the latter.

My refractometer thus covers a wide range of refractive indices, but still forms a single fixed unit requiring no movable parts for the purpose of finding the relative positions of the borderline of total reflection.

Further objects and advantages of my invention will appear as the specification proceeds, and the novel features of my improvements will be fully defined in the claims hereto appended.

The preferred form of the invention is illustrated in the accompanying drawing, forming part of this application, in which:

Figure 1 shows schematically, a longitudinal section through my refractometer;

Figure 2, an enlarged schematic view, in plan, of the optical parts of my device;

Figure 3, a similar view showing the optical parts in elevation;

Figure 4, a rear elevation of the prism unit shown in Figures 1, 2, and 3, as seen from line 4—4 of Figure 2;

Figures 5, 6 and 7, front elevations, respectively, of a multi-objective, a multi-scale lens and a multi-eye lens used in my device, as seen from lines 5—5, 6—6 and 7—7 of Figure 2; and Figure 8, a schematic view of the prism unit by itself.

While I have shown only the preferred form of my invention, it should be understood that various changes or modifications may be made within the scope of the claims hereto attached, without departing from the spirit of the invention.

Referring to the drawing in detail, my refractometer 1 comprises a telescope 2 having a prism 3 at its outer end, an ocular with a multi-eye lens 4 and a multi-scale lens 6 at its inner end, and a multi-objective 5 interposed between the prism and the ocular at proper distances.

The prism 3 is shown in different views in Figures 1-4, respectively and has three mirrors or other reflectors $a$, $b$, and $c$ attached thereto so as to form a rigid unit therewith. The entrance face of the prism is shown at 10, and the sample under observation, indicated at 11, is disposed on this entrance face. the rear or exit face of the prism is shown at 12.

The three mirrors which may be secured to the prism by any suitable means, schematically indicated at 13, are located in separate vertical planes, as shown in Figure 2, for cooperation with co-planar sections of the prism, are spaced longitudinally for receiving different sub-ranges of rays emanating from the rear face of the prism, and are inclined angularly for reflecting the rays in substantially axial direction with respect to the telescope.

When a ray forming the borderline of total reflection enters the prism at the entrance face, it is refracted, and as it leaves through the rear face, it is again refracted, the total refraction depending upon the refractive index of the sample under observation, the refractive index of the prism and the refracting angle thereof.

The refracted ray is reflected by one of the mirrors $a$, $b$ and $c$, and, since these mirrors are arranged at different locations with respect to the rear face of the prism and at different angularities, it is apparent that the particular angle at which the ray emerges from the rear face of the prism will determine which of the three mirrors will reflect the ray axially with respect to the telescope. The angles of the mirrors are arranged in such a way that the sub-ranges served by the three mirrors are either consecutive or partly overlapping.

The reflected rays pass to the objective 5 which serves the purpose of forming an image of the borderline of total reflection on the scale 6, where its position in scale divisions may be read. The objective is divided into a number of parallel sections 15, 16 and 17, corresponding to the sections of the prism, each section of the objective cooperating with one of the mirrors. It is desirable, of course, to have the sections of the objective mounted in a single unit and in the same plane.

The scale lens 6 is similarly divided into three sections 18, 19 and 20, and these sections are made to cooperate individually with the three sections of the objective and the three mirrors in such a manner that each scale section receives an image of the borderline of total reflection from its respective mirror only through a limited portion of the total range of the prism.

Assuming, for instance, that for the device as a whole, a total range of $nD$ 1.3 to 1.55 is desired, which is slightly more than the total range required for establishing the sugar content of a liquid, the refractive index for pure water being approximately $nD$ 1.33, and that of pure sugar being approximately $nD$ 1.55: If a single prism were used without the mirrors, as in the conventional refractometer, the total range of the rays forming the borderline of total reflection emanating from the rear face might spread fanwise, in a given example, over an angle of 30 degrees, the exact position of the borderline within an angle depending on the refractive index of the sample under observation. This total range would be impractical to utilize in connection with a single scale, due to inherent limitations in the dimensions of the telescope and its field of view at magnifications required for accurate readings.

It is proposed, therefore, in the present invention, to split the total range into a number of parts, three being selected for the purpose of example only, and to confine the central scale section to cooperative reading with a limited portion of the entire range of the central prism section, preferably, of course, the central portion.

Thus, I would divide the total range of 30 degrees of the prism 3 into three parts, each comprising ten degrees only. The central scale section 19, in Figure 6, would be arranged and calibrated to receive the image of the borderline of total reflection only if the refractive index of the sample under observation falls within the central range for reflection by the central mirror b.

We have assumed that the total range of the refractometer is to cover refractive indices of the samples between nD 1.3 and 1.55, which might be conveniently subdivided into three sub-ranges equivalent to those refractive indices that happen to fall within the three consecutive angles of ten degrees each.

In the sample under discussion, the central scale section would show the critical borderline of total reflection only if the sample falls within the middle range of 10 to 20 degrees, while, for the two outer ranges, the central scale would show either light or dark, depending upon whether the index of the sample is higher or lower than the central range.

The two outer sections 18 and 20 of the scale are intended for cooperation with the two outer mirrors a and c. While the two outer scale sections might be placed in any suitable position, provided the other cooperating optical components are lined up correspondingly, for convenience of operation, it is desirable that they be placed alongside of the central section within a rather limited field, as illustrated in Figure 6.

To allow such positioning it is necessary, that the two outer mirrors a and c be arranged so that the centerline of the range of rays issuing from each strikes its cooperative scale section at the center thereof.

We assumed that the total range of rays emanating from the prism extended over an angle of 30 degrees corresponding to a total range of refractive indices from nD 1.3 to 1.55. The central mirror b takes care of the central ten degrees covering the equivalent range of refractive indices. This leaves the two outer ten degree sections of the total angle to be taken care of by the two outer mirrors and the corresponding two outer scale sections.

While the central mirror is designed to project the centerline of its total range upon the center of the central scale section, the two outer mirrors are designed to project the respective centerlines of the two outer ten degree portions of the total range of emerging rays upon the respective centers of the two outer scale sections, each of the outer scale sections being limited to a range of 10 degrees, that is 5 degrees on opposite sides of each centerline.

In this manner the first mirror a cooperates with the first scale section 18 in indicating the image of the border line of total reflection, where the refractive index of the sample falls within the first 10 degrees of the total range of 30 degrees, while the second mirror b cooperates with the second scale section where the refractive index falls within the second 10 degrees of the total range of 30 degrees; and the third mirror c cooperates with the third scale section to take care of the third 10 degrees and their corresponding refractive indices.

Thus, when the refractive index of the sample happens to be such as to cause the borderline of total reflection to appear in the center of the second scale section, the first scale section and the bottom of the second section will appear dark, while the upper portion of the second section and the third section remain light.

The exact positions of the three mirrors with respect to the rear face of the prism may be found by calculation or experimentation.

It is the purpose of the new design to divide the total measuring range of the index prism into as many consecutive portions as will be necessary in order to cover each of them by a separate ocular scale. Since the length of such scale is limited to the field of vision of the telescope in conjunction with which it is to be used, and since this field of view is largely determined by the magnification of the telescope, it follows that the latter, to a large extent, will also determine the number of scales required in order to distribute over them the total measuring range of the refractometer.

The number of scales obviously will determine the number of mirrors used and their arrangement with respect to the prism. While, for example, the demands upon the reading accuracy made on a hand-refractometer are moderate, and a low telescope magnification with a large field of view would be sufficient, the demands in the case of a research refractometer would be much more exacting, meaning that a high telescope magnification would have to be used in order to attain the desired accuracy. While, in the former case, two or three scales would suffice, more would be required in the latter case.

I claim:

1. A refractometer comprising a rigid housing, a series of spaced scales of consecutive values mounted in a limited field in said housing, a refracting means rigidly mounted in the housing in operative relation to the scales for refracting rays passing through samples under observation in accordance with the refractive indices of the samples, the refracting means comprising an index prism having a rear face and a plurality of reflectors fixedly mounted with respect to the said rear face at different angularities for splitting the total range of rays emanating from the rear face into a series of sub-ranges of consecutive sample index values corresponding to the scale values and for directing the sub-ranges toward the corresponding scales, and rigid means interposed between the refracting means and the scales for rendering the sub-ranges of refracted rays readable on the scales of corresponding measuring values whereby the refractometer is made to selectively register the index value of any sample within the total range on one of the scales, without requiring mechanical adjustment.

2. A refractometer comprising a rigid housing, a series of spaced scales of consecutive values mounted in a limited field in said housing, a refracting means rigidly mounted in the housing in operative relation to the scales for refracting rays passing through samples under observation in accordance with the refractive indices of the samples, the refracting means comprising an index prism having a rear face and a plurality of reflectors mounted with respect to the said rear face at different angularities for splitting the total range of rays emanating from the rear face into a series of sub-ranges of consecutive sample index values corresponding to the scale values and for directing the sub-ranges toward the corresponding scales, and rigid means interposed between the refracting means and the scales for rendering the sub-ranges of refracted rays readable on the scales of corresponding measuring values whereby the refractometer is made to selectively register the index value of any sample within the total range on one of the scales, without requiring mechanical adjustment.

MARTIN SILGE.